No. 650,171. Patented May 22, 1900.
C. DANNEHL.
SLED ATTACHMENT FOR CYCLES.
(Application filed Mar. 15, 1899.)

(No Model.) 2 Sheets—Sheet 1.

WITNESSES:
M. Henry Wurtzel
George Geibel

INVENTOR
Carl Dannehl
BY
ATTORNEYS.

No. 650,171. Patented May 22, 1900.
C. DANNEHL.
SLED ATTACHMENT FOR CYCLES.
(Application filed Mar. 15, 1899.)
(No Model.) 2 Sheets—Sheet 2.
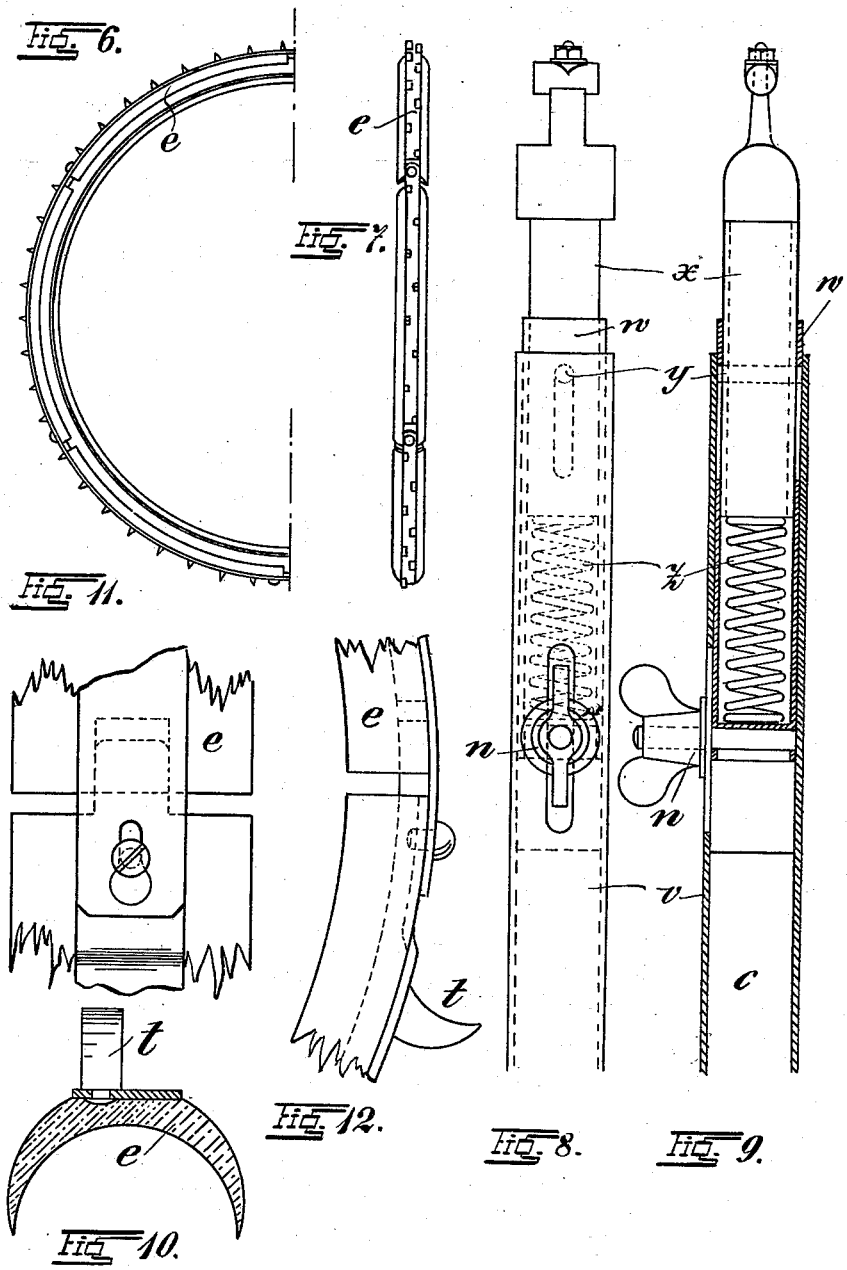
WITNESSES:
INVENTOR
Carl Dannehl.
BY
ATTORNEYS.

UNITED STATES PATENT OFFICE.

CARL DANNEHL, OF NEUHÄUSER, GERMANY.

SLED ATTACHMENT FOR CYCLES.

SPECIFICATION forming part of Letters Patent No. 650,171, dated May 22, 1900.

Application filed March 15, 1899. Serial No. 709,229. (No model.)

*To all whom it may concern:*

Be it known that I, CARL DANNEHL, of Neuhäuser, East Prussia, in the German Empire, have invented some new and useful Improvements in Means for Transforming Ordinary Cycles into a Sledge for Use on Snow or Ice; and I declare that the following is a full and clear description.

This invention has for its object new or improved fittings by means of which it is possible to transform an ordinary cycle into a sledge for use on snow or ice.

Figure 1:
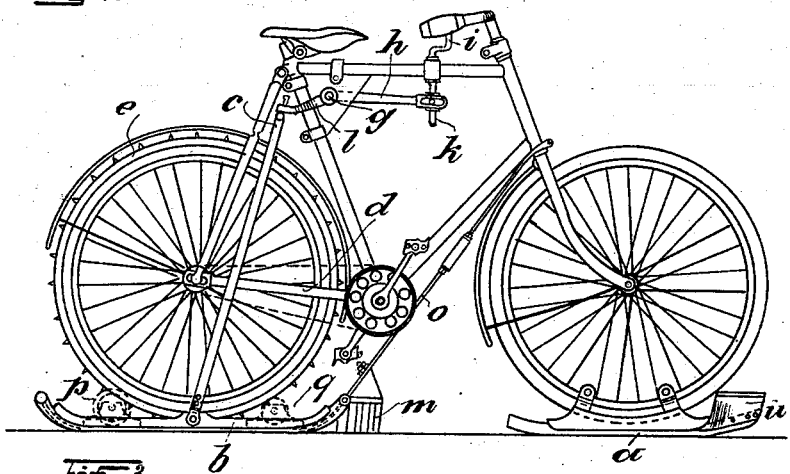
Figure 2:
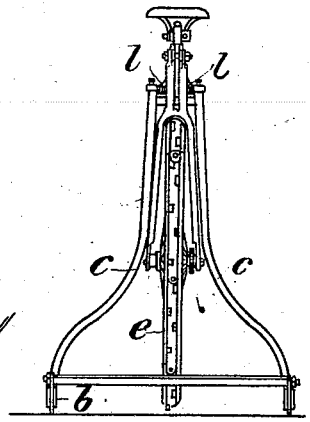

In the annexed drawings, Figure 1 represents in side view a cycle fitted with the new arrangement. Fig. 2 is a back view. Figs. 3 to 12 represent particular constructions in detail of the parts.

$a$ is the runner or shoe of the sledge for the front wheel, secured to the wheel in proper manner—for example, by clamps—and provided on its front part with a projection-piece for the protection of the tire.

$b$ is a sledge-frame, on which is supported the cycle by means of the struts $c$. The tie-bars $d$ of the cycle-frame will bear upon and have support on projections of bars $c$, (fitted with felt, leather, or the like,) whereupon there is obviated side motion of the cycle on the sledge. The back wheel, which serves as a driving-wheel, is provided with the spiked sheath or cover $e$, as follows: Figs. 6, 7, 10, and 12 show details of the parts, which can be connected together in a suitable manner. It is advantageous to consider the usual sizes of the pneumatic-tired cycles, so that the spiked or sheath cover can be applied as well on cycles with wheels of twenty-six inches as on those of twenty-eight inches in diameter. The spiked sheath in cross-section, Fig. 10, corresponds to the profile of the cycle-tire, and to secure the same must first be allowed to escape from the pneumatic tire. Then separate sections or parts of the spiked sheath can be put on and connected together. An example of such attachment means, with tongue pieces or flaps and slits or openings combined with headed screws, is represented in Figs. 11 and 12 in approximately-full size. After having thus closed the spiked sheath the pneumatic tire is to be again filled with air, which applies itself therefor to the inner groove or contour of the spiked sheath, so that there is provided a reliable connection between the driving-wheel and its sheath without using special fastening means between the two parts. The spikes $t$ on the sheath $e$ are purposely bent forward in direction of the course of the cycle to at once prevent fracture of the same and to facilitate the grip on and withdrawal from the ice.

According to the nature of the ice or the snow cover care must be taken to provide always a proper catch of the spikes of the back driving-wheel, and therefore an arrangement is necessary for a precise adjustment of the back wheel from its work. Penetration of the spikes is less required when the ice cover is even than when it is rough or when going over snow surfaces. This raising or placing of the back wheel in the proper position of elevation can be secured by means of first turning the lever $h$ by means of the hand-crank $i$ and set-screw $k$. This lever $h$ is centered on the plug $g$, and said lever $h$ has the extension-arms $l$, attached to the framing-bars $c$. Thus by raising or lowering the lever $h$ can be effected a higher or lower placement of the cycle-framing and therefore of the back wheel.

The front end of the sledge proper, $b$, is provided with a cleanser-scraper $m$. This consists of vertically-disposed steel spring-strips working against each other sidewise. This cleanser $m$ clears the way for the back-wheel sledge without finding resistance on the hummocks of the ice and without gathering snow in front of the sledge.

Figure 3:
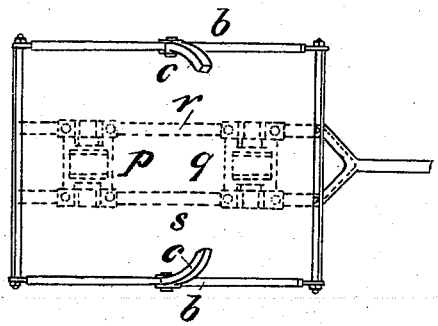
Figure 4:
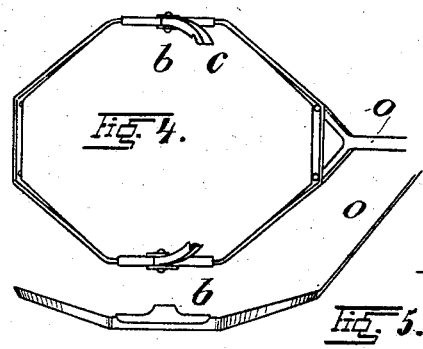

A quadrangular form (see Fig. 3) can be given to the sledge or the runners of the sledge can be made shorter and an octagonal form can be given to the framing, which last form is shown in Fig. 5 in side view and in Fig. 4 in plan. In employing this form it is desirable to give to the front and back frame an upward trend, so as to leave the side runners free. The quadrangular form of the sledge is in many cases preferable, as affording to the runners greater length and consequent advantage in riding over rough surfaces of the ice. The sledge can also be arranged as a carrier to take other persons or goods. For this purpose there can be applied on the sledge a footboard or platform and a seat, as now used with racing-sledges, or an extension of the sledge can be used for the carriage of goods.

According to differing sizes of the cycle an adjustability of the supporting-bars $c$ is desirable. For this purpose said bars $c$ can be extended or shortened by the sliding telescopic parts $v$ and $w$, which can be fixed by means of the wing-nut $n$ after the adjustment. In such supporting-bars $c$ can be inserted springs $z$ for purpose of relieving shock when going upon rough ground. In the arrangement shown in Figs. 8 and 9 the spring $z$ lies under the head-stock $x$, the motions whereof in its length can be restricted by means of a pin $y$ in a slot of the tube $w$.

$o$ is a pole serving as the connection between the sledge $b$ and the stem of the front fork. It is contemplated to arrange on this pole $o$ a regulating tight-nut or the like, by means of which the pole can be lengthened or shortened, according to the size of the cycle.

A "home" training apparatus can be combined with the sledge $b$, consisting of two pairs of bearing-blocks and the running-rollers $p$ $q$, mounted removably in any suitable way on the bands $r$ $s$, or the bands $r$ $s$ may be removable when the home trainer is not required for use. The bearings of the rollers $p$ $q$ may be made movable on the bands $r$ $s$, so as to be fixed apart, according to the diameter of the back wheel or distance of the wheels apart. This training apparatus can be applied to the sledge $b$ when exercise has to be made in a room or inclosed space. In using this home trainer device the spiked sheath is to be taken from the back wheel and the same is to be let down in its bearings so far that it may rest on the rollers $p$ $q$, so that by treadling movement of the back wheel is possible without effecting a forward motion of the cycle. The resistance in the training device and practice can be increased or diminished by setting the raising or lowering frame of the cycle relatively to the rolls $p$ $q$.

The dotted lines of Figs. 1 and 3 indicate the arrangement of the said training apparatus.

Having now particularly described and ascertained the nature of my said invention and in what manner the same is to be performed, I declare that what I claim is—

1. A cycle-sledge apparatus, consisting of a cycle, a runner applied to the front wheel, a runner-frame under the rear wheel, a connecting-rod between the runner-frame and the front fork of the cycle, supporting bars or struts extending upwardly to a point adjacent to the saddle, and means connected with said supporting-bars and extending in front of the saddle for adjusting said runner-frame relatively to the rear wheel, substantially as set forth.

2. A cycle-sledge apparatus, consisting of a cycle, a runner applied to the front wheel, a runner-frame under the rear wheel, a connecting-rod between the runner-frame and front fork of the cycle, supporting bars or struts extending upwardly to a point adjacent to the saddle, a lever pivoted just under the saddle, and connected at one end to the upper end of said supporting-bars, a handle arranged in front of the saddle, and adjusting means between the handle and the other end of said lever, whereby the latter is raised or lowered for adjusting the position of said runner-frame relatively to the rear wheel, substantially as set forth.

3. A cycle-sledge apparatus, consisting of a cycle, a runner fixed to the front wheel, a runner-frame under the rear wheel, means for attaching the same to the cycle, and a spiked sheath applied around the rear wheel, and consisting of sections provided with slitted tongues and screws passing through the slits into the adjacent sections, substantially as set forth.

4. A cycle-sledge apparatus, consisting of a cycle, a runner applied to the front wheel, a runner-frame under the rear wheel, a connecting-rod between the runner-frame and the front fork of the cycle, sectional supporting-bars suitably supported at their upper ends from a point just under the saddle and extending downwardly and pivoted at their lower ends to said runner-frame, and cushioning-springs interposed in the sections of said supporting-bars, substantially as set forth.

In witness whereof I have hereunto set my hand in presence of two witnesses.

CARL DANNEHL.

Witnesses:
RUDOLF FRIESS,
WILHELM WEIDNER.